Figure 1:
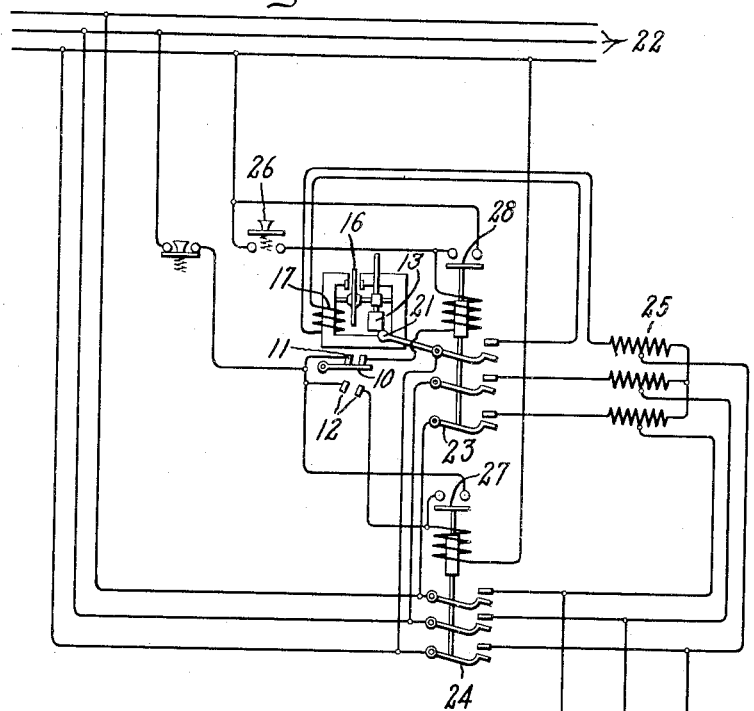

Jan. 16, 1923.

L. W. THOMPSON.
TIME LIMIT, CURRENT LIMIT CONTROL FOR ELECTRIC MOTORS.
FILED AUG. 11, 1920.

1,442,310.

Inventor:
Louis W. Thompson,
by *Alvan G. Darbi*
His Attorney.

Patented Jan. 16, 1923.

1,442,310

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

TIME LIMIT, CURRENT LIMIT CONTROL FOR ELECTRIC MOTORS.

Application filed August 11, 1920. Serial No. 402,752.

*To all whom it may concern:*

Be it known that I, LOUIS W. THOMPSON, a citizen of the United States, residing at Schenectady, in the county of Schenectady, State of New York, have invented certain new and useful Improvements in Time Limit, Current Limit Controls for Electric Motors, of which the following is a specification.

My invention relates to the control of electric motors and it provides improved means whereby the motors are started and stopped in a safe, reliable and efficient manner.

There are two well known forms of automatic control for starting electric motors, one of which is known as the time limit control and the other of which is known as the current limit control. In the time limit control, a definite time interval is provided between the closing of the successively operated motor controlling switches, and in the current limit control the succession is controlled responsively to the current taken by the motor; that is, each accelerating switch will not close until the motor current has dropped to a predetermined value after the closing of the preceding accelerating switch.

Time limit control has the advantage that the switches will in all events close with the predetermined time interval between the successive closing of the switches, and the time for acceleration of the motor will always be substantially the same; but in case the current taken by the motor is small, the time for acceleration is too great, and if adjusted for a short time interval, the current peaks may be too great. The current limit control has the advantage that the smaller the current taken by the motor the quicker it will be accelerated to full operating speed, but in case the current limit device is set to operate at a low value of current the motor will be accelerated too slowly and, if set to operate at a high value of current, the acceleration will be too fast. Furthermore, if the load on the motor is such that the current is so high that the current limit device will not operate, the successive closing of the motor controlling switches will not proceed, and that is undesirable in many installations.

In accordance with my invention, I provide an improved time limit device which gives a time interval which is varied as the current taken by the motor varies, but which will in all events positively operate so that the progression of the motor controlling switches will proceed even though the current is high, and in case the current is low the motor will be accelerated quickly. The advantages of both systems are thereby secured without their attendant disadvantages.

Figure 2:
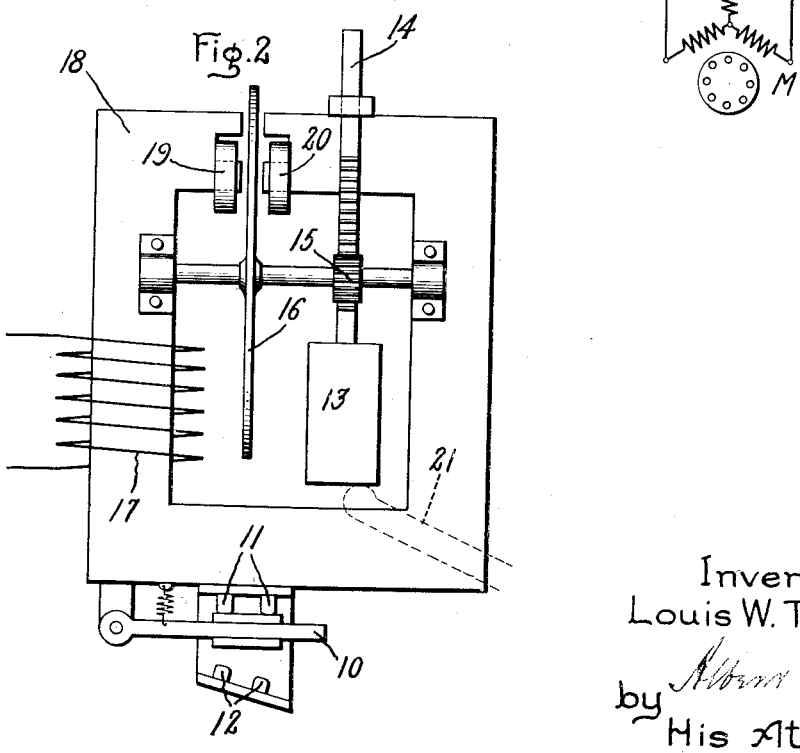

For a better understanding of my invention, reference is had to the accompanying drawing wherein I have embodied my invention in concrete form for purposes of illustration, and in which Fig. 1 is a system of motor control embodying my invention, and Fig. 2 is a simplified diagrammatic showing of my improved time element-current limit device. Reference may first be had to Fig. 2, and the arrangement of my improved time element-current limit device will be explained. Referring to this figure, the pivoted switch member 10 is provided for controlling the motor control switches, and is biased so as to make engagement with the upper set of stationary contacts 11, and to make engagement with the lower set of stationary contacts 12 when the biased controlling member or weight 13 makes engagement with the end of the switch member. The controlling member 13 is provided with a rod 14 having gear teeth cut thereon for a portion of the length of the rod so as to form a rack with which the pinion 15, mounted on the same shaft as the copper disc 16, is adapted to cooperate. This copper disc 16 forms the rotating element or armature of an electric controlling motor having a series winding 17 and a laminated magnetic structure 18. The winding 17 is adapted to be energized in accordance with the current taken by the motor, and by reason of copper bands or pole-shaders 19 and 20 the flux set up through the magnetic structure will produce a turning moment or torque on the disc 16 which will have a tendency to lift the weighted control member 13 through the cooperation of the pinion 15 with the rack on the rod 14. The weight of the controlling member 13 is held in its upper or initial position by any suitable means, as, for instance, the extension 21 on a motor controlling switch. The weight of the controlling member 13 will be such that it will always be sufficient to rotate the copper disc 16 against its tendency to rotate in the opposite direction due to its motor action. If the winding 17 is not energized it will take the controlling member a certain definite interval of time to drop from the position shown in the drawing to its lowermost position, but if the winding 17 is energized there will be an opposing torque set up which will retard the fall of the controlling member 13 responsively to the energization of the winding 17 so that the time interval will thereby be increased responsively to the energization of the winding 17. As commercially manufactured, the copper disc 16 will have a pulsating torque due to the fact that the device operates as a single phase motor. That feature is taken advantage of in my invention to produce a notching effect in the downward movement of the controlling member 13, and the intervals between the "notches" will be determined by the energization of the winding 17—the greater the energization of the winding 17, the greater will be the time interval between notches. It will also be observed that the rack on the rod 14 does not extend to the end of the rod, so that when the controlling member 13 has dropped to a predetermined position, the pinion 15 will be out of engagement with the rack on the rod 14 and the controlling member will drop quickly so as to quickly open the circuit to the contacts 11 and quickly close the circuit to the contacts 12.

Referring now to Fig. 1, the electric motor M, which is shown as of the squirrel cage three-phase type, is adapted to be connected to the three-phase source of supply 22 by means of two successively operated electromagnetic switches 23 and 24. The closing of the first electromagnetic switch or contactor 23 connects the motor to the source of supply through the auto-transformer 25, thereby applying a potential which is less than the potential of the source of supply. When the contactor 23 is then opened and the contactor 24 closed, the motor is connected directly to the supply circuit with full potential applied to the motor. My improved time limit current limit device is used for automatically opening the winding circuit of the contactor 23 and immediately thereafter closing the winding circuit of the contactor 24, and the winding 17 is connected in one of the supply circuits so that this winding is energized in accordance with the current taken by the motor when the contactor 23 is closed.

As thus constructed and arranged, and with the various parts in their respective positions shown in the drawing, the operation of my invention is as follows:—

In order to connect the motor to the supply circuit with a reduced potential applied to the motor terminals, the start push button 26 is temporarily closed, thereby energizing the winding of the start contactor 23 across one phase of the supply circuit through the switch member 10 of the time limit-current limit device. When the contactor 23 closes, the extension 21 will be released from engagement with the controlling member 13, and the winding 17 will be energized in accordance with the current taken by the motor. The controlling member 13 will drop gradually, and the operation of the controlling member will be opposed by the turning moment or torque on the disc 16, and this torque will be proportional to the current taken by the motor. When the controlling member 13 has dropped to such a position that the pinion 15 is out of engagement with the rack on the rod 14, it will drop quickly and engage the switch member 10. This switch member will be struck a hammer blow and the circuit to the stationary contacts 11 will be opened, and immediately thereafter the circuit to the contacts 12 will be closed. As the circuit to the contacts 12 is closed, the winding of the contactor 24 will be energized across one of the phases of the source of supply, and the contactor 24 will be closed. This contactor in closing will establish a maintaining circuit for its winding through the auxiliary switch 27.

When the contactor 23 closes, it establishes a maintaining circuit for its winding through the auxiliary switch 28 which has contacts shunting the start push button 26 so that the start push button need not be held closed after the contactor 23 is closed.

When the winding of the starting switch or contactor is deenergized by the opening of the circuit to the contact 11, this contactor will drop open, thereby returning the controlling member 13 to its position shown on the drawing, ready for starting the motor a second time. The winding 17 will, however, be deenergized so that there will be no opposing effect set up by the disc 16.

The switch member 10 and its contacts 11 and 12 will be so arranged with respect to the controlling member 13 and the means for returning the controlling member to its initial position so that the operation will be as above described, and it is to be understood that the drawings have been made up in the manner shown solely for the purpose of giving a quick understanding of the invention.

In accordance with the provisions of the patent statutes, I have described the principle of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. A controller for electric motors comprising two separately operated motor controlling switches, a time element device for controlling the switches set in operation by the closing of the first switch and retarded in its action responsively to the current taken by the motor, and connections whereby the operation of the time element device causes the opening of the first switch and immediately thereafter the closing of the second switch.

2. A controller for electric motors comprising a starting switch and a running switch, a time element device set in operation by the closing of the starting switch and retarded in its action in accordance with the current taken by the motor, and connections whereby the operation of the time element device effects the opening of the starting switch an interval of time after the closing thereof and immediately thereafter the closing of the running switch.

3. A controller for electric motors comprising a starting switch and a running switch, a time element device having a rotatable member set in operation by the closing of the starting switch and retarded in its rotation in accordance with the current taken by the motor, means governed by the rotatable member for effecting the opening of the starting switch an interval of time after the closing thereof and immediately thereafter the closing of the running switch.

4. A controller for electric motors comprising a starting switch and a running switch, a time element device set in operation by the closing of the starting switch for opening the starting switch an interval of time after the closing thereof and immediately thereafter closing of the running switch, and means for varying the said time interval responsively to the current taken by the motor.

5. A controller for electric motors comprising two separately operated motor controlling switches, a time element device retarded in its action responsively to the current taken by the motor for controlling the said switches, means connecting the said device with the first switch whereby the device is set in operation by the closing of the first switch and returned to its original position by the opening of the first switch, and connections whereby the operation of the time element device causes the opening of the first switch and then the closing of the second switch.

6. A controller for electric motors comprising a starting switch and a running switch, a time element device set in operation by the closing of the starting switch for controlling the said switches, the said time element device comprising a motor having a torque corresponding to the current taken by the motor to be controlled and a biased controlling member acting in opposition to the torque of the time element motor for causing the opening of the starting switch an interval of time after the closing thereof and immediately thereafter the closing of the running switch.

7. A controller for electric motors comprising a starting switch and a running switch, a time element device set in operation by the closing of the starting switch comprising an electric motor having a winding energized responsively to the current taken by the motor to be controlled and an armature adapted to be driven in one direction when the winding is energized, a pinion driven by the armature, a biased member having a rack cooperating with the pinion, the said biased member adapted to rotate the armature in one direction against its tendency to rotate in the other direction when the winding is energized, and switch mechanism controlled by the biased member for controlling the said switches.

In witness whereof, I have hereunto set my hand this 10th day of August, 1920.

LOUIS W. THOMPSON.